United States Patent
Doerr

(10) Patent No.: US 11,112,623 B1
(45) Date of Patent: *Sep. 7, 2021

(54) DISTRIBUTED CMOS DRIVER WITH ENHANCED DRIVE VOLTAGE FOR SILICON OPTICAL PUSH-PULL MACH-ZEHNDER MODULATORS

(71) Applicant: Acacia Communications, Inc., Maynard, MA (US)

(72) Inventor: Christopher Doerr, Middletown, NJ (US)

(73) Assignee: Acacia Communications, Inc., Maynard, MA (US)

( * ) Notice: Subject to any disclaimer, the term of this patent is extended or adjusted under 35 U.S.C. 154(b) by 78 days.

This patent is subject to a terminal disclaimer.

(21) Appl. No.: 16/654,519

(22) Filed: Oct. 16, 2019

Related U.S. Application Data

(63) Continuation of application No. 14/475,503, filed on Sep. 2, 2014, now Pat. No. 10,488,682.

(60) Provisional application No. 61/872,658, filed on Aug. 31, 2013.

(51) Int. Cl.
*G02F 1/01* (2006.01)
*G02F 1/21* (2006.01)
*G02F 1/225* (2006.01)

(52) U.S. Cl.
CPC ............... *G02F 1/01* (2013.01); *G02F 1/218* (2013.01); *G02F 1/225* (2013.01); *G02F 1/0121* (2013.01); *G02F 1/212* (2021.01); *G02F 2201/126* (2013.01)

(58) Field of Classification Search
CPC .......... G02F 1/01; G02F 1/0123; G02F 1/225; G02F 2001/212; G02F 2203/50
See application file for complete search history.

(56) References Cited

U.S. PATENT DOCUMENTS

| | | | |
|---|---|---|---|
| 6,265,893 B1 | 7/2001 | Bates | |
| 8,346,025 B2 | 1/2013 | Gill | |
| 8,744,219 B2* | 6/2014 | Kato | H04B 10/556 |
| | | | 385/3 |
| 9,036,954 B2 | 5/2015 | Kobrinsky et al. | |
| 9,531,478 B2 | 12/2016 | Zheng et al. | |
| 2003/0025962 A1 | 2/2003 | Nishimura | |
| 2003/0227666 A1 | 12/2003 | Bridges | |
| 2011/0318016 A1 | 12/2011 | Wyss et al. | |
| 2012/0163811 A1 | 6/2012 | Doany et al. | |
| 2013/0176609 A1 | 7/2013 | Noguchi | |
| 2014/0133866 A1 | 5/2014 | Liu et al. | |
| 2015/0030339 A1 | 1/2015 | Margalit et al. | |
| 2015/0036965 A1 | 2/2015 | Prosyk et al. | |
| 2015/0049978 A1 | 2/2015 | Fujikata et al. | |

(Continued)

FOREIGN PATENT DOCUMENTS

JP 5994230 9/2016

OTHER PUBLICATIONS

Milivojevic et al. 112Gb/s DP-QPSK Transmission Over 2427km SSMF Using Small-Size Silicon Photonic IQ Modulator and Low-Power CMOS Driver OSA OFC/NFOEC Tech Digest 2013 3pgs.

(Continued)

*Primary Examiner* — Darryl J Collins
*Assistant Examiner* — Tamara Y. Washington
(74) *Attorney, Agent, or Firm* — Joseph D'Angelo

(57) ABSTRACT

A method and apparatus for driving an optical push-pull Mach-Zehnder modulator.

19 Claims, 1 Drawing Sheet

(56) References Cited

U.S. PATENT DOCUMENTS

| | | |
|---|---|---|
| 2015/0229408 A1 | 8/2015 | Ding et al. |
| 2016/0103382 A1 | 4/2016 | Liboiron-Ladouceur et al. |
| 2016/0218811 A1 | 7/2016 | Chen et al. |
| 2017/0285437 A1 | 10/2017 | Doerr et al. |
| 2018/0039151 A1 | 2/2018 | Doerr et al. |

OTHER PUBLICATIONS

International Search Report and Written Opinion for International Patent Application PCT/US2017/038489, dated Sep. 13, 2017, 12 pgs.

* cited by examiner

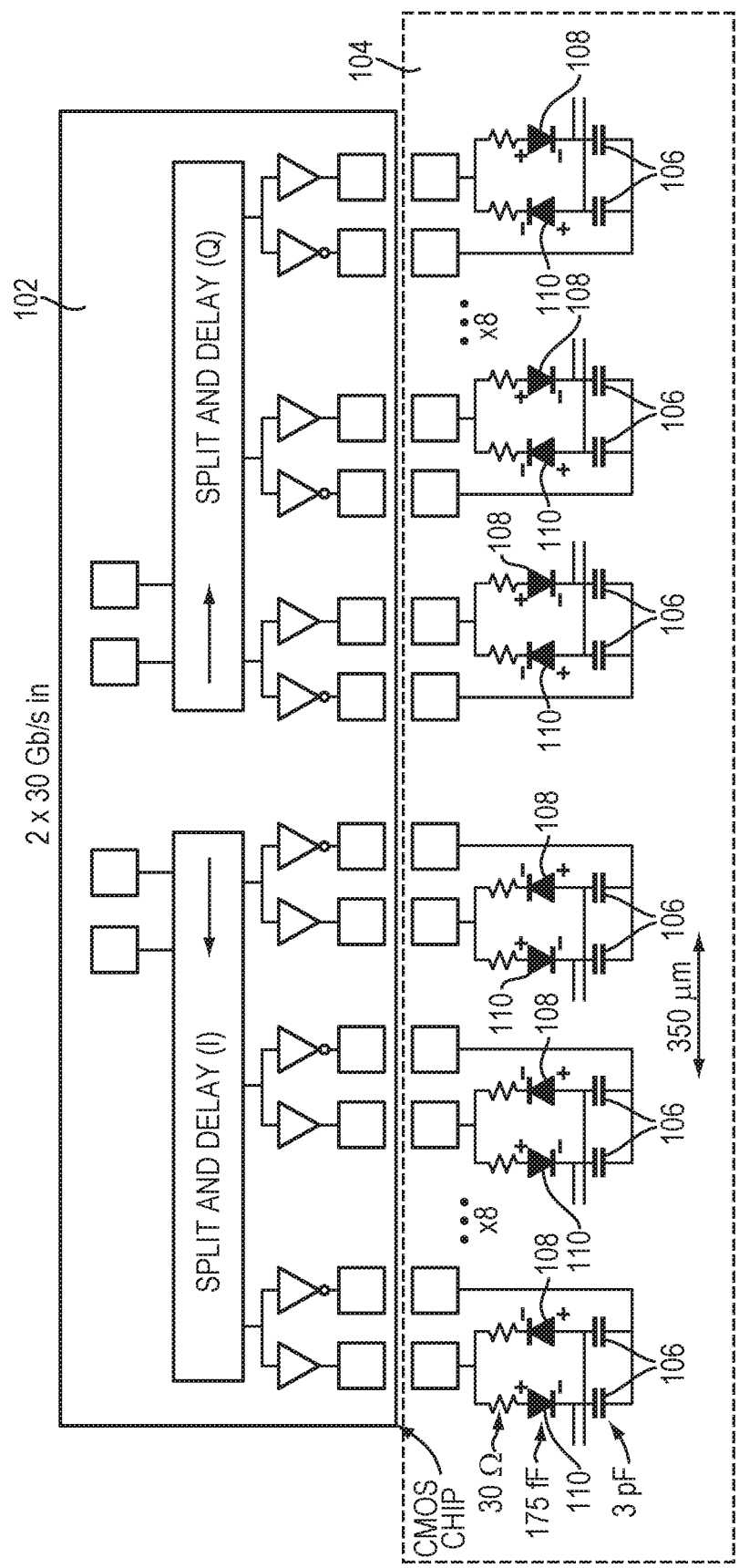

DISTRIBUTED CMOS DRIVER WITH ENHANCED DRIVE VOLTAGE FOR SILICON OPTICAL PUSH-PULL MACH-ZEHNDER MODULATORS

CROSS REFERENCE TO RELATED APPLICATIONS

The present application is a continuation claiming the benefit under 35 U.S.C. § of U.S. patent application Ser. No. 14/475,503 filed Sep. 2, 2014 entitled "Distributed CMOS Driver with Enhanced Drive Voltage for Silicon Optical Push-Pull Mach-Zehnder Modulators," which claims the benefit under 35 U.S.C. § 119€ of U.S. Provisional Patent Application Ser. No. 61/872,658 filed Aug. 31, 2013 entitled "Distributed CMOS Driver with Enhanced Drive Voltage," both of which are incorporated herein by reference in their entireties as if set forth at length herein.

TECHNICAL FIELD

This disclosure relates generally to optical communications systems. More particularly, this disclosure pertains to techniques, methods and apparatus for CMOS drivers that drive silicon optical push-pull Mach-Zehnder modulators (MZMs) exhibiting twice the drive voltage per interferometer arm as with prior art designs.

BACKGROUND

Contemporary optical communications systems make extensive use of silicon optical modulators and complementary metal-oxide-semiconductor (CMOS) electronics which may advantageously drive the silicon optical modulators at very high speeds while consuming very low power. Accordingly, improved driver configurations for such optical transceivers would represent a welcome addition to the art.

SUMMARY

An advance in the art is made according to an aspect of the present disclosure directed to method(s) and driver(s) for driving silicon optical push-pull Mach-Zehnder modulators (MZMs) wherein individual interferometer arms are driven with twice the drive voltage as compared with other, known configurations.

In contrast to contemporary prior-art configurations wherein the modulator is connected directly to CMOS transistors, and diodes employed in such configurations are connected back-to-back—in series, modulator drivers according to the present disclosure drive the diodes in parallel.

BRIEF DESCRIPTION OF THE DRAWING

A more complete understanding of the present disclosure may be realized by reference to the accompanying drawing in which:

FIG. 1 shows a schematic of an illustrative CMOS driver according to an aspect of the present disclosure.

DETAILED DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope. More particularly, while numerous specific details are set forth, it is understood that embodiments of the disclosure may be practiced without these specific details and in other instances, well-known circuits, structures and techniques have not be shown in order not to obscure the understanding of this disclosure.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the disclosure.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

By way of some additional background, we begin by again noting that complementary metal-oxide-semiconductor (CMOS) electronics may drive silicon optical modulators at very high speeds while consuming very low power. (See, e.g., B. Milivojevic, C. Raabe, A. Shastri, M. Webster, P. Metz, S. Sunder, B. Chattin, S. Wiese, B. Dama, and K. Shastri, "112 Gb/s DP-QPSK Transmission Over 2427 km SSMF Using Small-Size Silicon Photonic IQ Modulator and Low-Power CMOS Driver," *Optical Fiber Communication Conference*, 2013, pp. 5-7).

As generally disclosed in the art however, the modulator is connected directly to CMOS transistors, and as such the modulator is "viewed" electronically as a capacitance. Additionally, diodes employed in such configurations are connected back-to-back—in series. While such configurations generally reduce the capacitance by a factor of two, it also reduces the voltage across diode (i.e., each arm of the MZI) by a factor of two as well. As may be appreciated, such design(s) are optimized for modulators having an oxide barrier, which have a high capacitance and low $V_\pi L$.

In contrast to such prior-art configurations, modulator drivers according to the present disclosure drive the diodes in parallel. With reference now to FIG. 1, there is shown a schematic of a driver configuration according to an aspect of the present disclosure. More specifically, the illustrative driver configuration shown is for a two-channel distributed driver according to the present disclosure.

As may be appreciated by those skilled in the art, a distributed driver comprises "breaking," or logically segmenting the modulator into multiple sections. As depicted in the illustrative FIG. 1, the modulator is logically broken into or segmented into eight sections. Subsequently, each of the sections is driven at an appropriate timing such that an optical group velocity in the modulator is matched.

As may be further understood, larger capacitors (about 10 times the value of the diode capacitance) are added in series to the diodes such that a DC bias voltage is provided to the diodes. Those skilled in the art will appreciate that while eight illustrative sections are depicted in this illustrative FIG. 1, that number of sections may be changed as appropriate to a particular application.

Shown in FIG. 1 in the upper half of that FIGURE is the CMOS chip while the lower half shows the equivalent circuit of the optical modulators. The bond pads are depicted by the rectangular shapes.

At this point, those skilled in the art will readily appreciate that while the methods, techniques and structures according to the present disclosure have been described with respect to particular implementations and/or embodiments, those skilled in the art will recognize that the disclosure is not so limited. Accordingly, the scope of the disclosure should only be limited by the claims appended hereto.

What is claimed is:

1. A silicon optical modulator driver comprising:
   driver circuitry configured to:
      electrically drive a first plurality of diodes with a first modulating signal, the first plurality of diodes disposed at differing locations on a first common optical waveguide arm of a Mach-Zehnder optical modulator; and
      electrically drive a second plurality of diodes with a second modulating signal, the second plurality of diodes disposed at differing locations on a second common optical waveguide arm of the Mach-Zehnder optical modulator;
   wherein at least a first diode of the first plurality of diodes is electrically connected in parallel to at least a second diode of the second plurality of diodes.

2. The silicon optical modulator driver of claim 1, wherein the first modulating signal is an I signal.

3. The silicon optical modulator driver of claim 1, wherein the second modulating signal is a Q signal.

4. The silicon optical modulator driver of claim 1, wherein the driver circuitry is further configured to electrically bias at least the first diode of the first plurality of diodes using a capacitor connected in series to the first diode of the first plurality of diodes.

5. The silicon optical modulator driver of claim 1, wherein the first diode of the first plurality of diodes has an anode electrically coupled to a cathode of the second diode of the second plurality of diodes.

6. A method comprising:
   electrically driving a first waveguide arm of a Mach-Zehnder optical modulator and a second waveguide arm of the Mach-Zehnder optical modulator by providing a first modulating voltage to a first plurality of diodes disposed at differing locations on the first waveguide arm and a second modulating voltage to a second plurality of diodes disposed at differing locations on the second waveguide arm;
   wherein at least a first diode of the first plurality of diodes is electrically connected in parallel to at least a second diode of the second plurality of diodes.

7. The method of claim 6, further comprising electrically biasing at least the first diode of the first plurality of diodes using a capacitor connected in series to the first diode of the first plurality of diodes.

8. The method of claim 6, wherein electrically driving the first waveguide arm of the Mach-Zehnder optical modulator comprises matching an optical group velocity of an optical mode propagating along the first waveguide arm with the first modulating voltage.

9. The method of claim 6, wherein the first modulating signal is an I signal.

10. The method of claim 6, wherein the second modulating signal is a Q signal.

11. A Mach-Zehnder optical modulator comprising:
   a first waveguide arm of the Mach-Zehnder optical modulator optically coupled to an input waveguide and to an output waveguide;
   a second waveguide arm of the Mach-Zehnder optical modulator optically coupled to the input waveguide and to the output waveguide;
   a first plurality of diodes disposed at differing locations on the first waveguide arm;
   a second plurality of diodes disposed at differing locations on the second waveguide arm; and
   a driver coupled to the first plurality of diodes and coupled to the second plurality of diodes, wherein at least a first diode of the first plurality of diodes is electrically connected in parallel to at least a second diode of the second plurality of diodes.

12. The Mach-Zehnder optical modulator of claim 11, further comprising control circuitry configured to electrically drive the first plurality of diodes and the second plurality of diodes.

13. The Mach-Zehnder optical modulator of claim 11, further comprising a plurality of capacitors, wherein at least one capacitor of the plurality of capacitors is disposed in series to a corresponding diode of the first plurality of diodes.

14. The Mach-Zehnder optical modulator of claim 13, wherein each capacitor of the plurality of capacitors is disposed in series to a respective diode of the first plurality of diodes.

15. The Mach-Zehnder optical modulator of claim 11, wherein the first and the second waveguide arms are made of silicon.

16. The Mach-Zehnder optical modulator of claim 11, wherein the first diode of the first plurality of diodes has a cathode electrically coupled to an anode of the second diode of the second plurality of diodes.

17. The Mach-Zehnder optical modulator of claim 11, wherein the first diode of the first plurality of diodes has an anode electrically coupled to a cathode of the second diode of the second plurality of diodes.

18. The Mach-Zehnder optical modulator of claim 11, wherein the first modulating signal is an I signal.

19. The Mach-Zehnder optical modulator of claim 11, wherein the second modulating signal is a Q signal.

\* \* \* \* \*